US006938143B2

(12) United States Patent
Le

(10) Patent No.: US 6,938,143 B2
(45) Date of Patent: Aug. 30, 2005

(54) DYNAMICALLY ADAPTIVE BUFFER MECHANISM

(75) Inventor: Hung Q. Le, Katy, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/641,755

(22) Filed: Aug. 15, 2003

(65) Prior Publication Data

US 2004/0052135 A1 Mar. 18, 2004

Related U.S. Application Data

(63) Continuation of application No. 09/428,874, filed on Oct. 28, 1999, now Pat. No. 6,678,813.

(51) Int. Cl.[7] .................................................. G06F 12/00

(52) U.S. Cl. ...................... 711/172; 711/173; 711/147; 710/56

(58) Field of Search ................................ 711/172, 173, 711/147, 170; 710/22, 52, 56

(56) References Cited

U.S. PATENT DOCUMENTS

| | | | | |
|---|---|---|---|---|
| 4,603,382 A | | 7/1986 | Cole et al. | |
| 5,179,662 A | * | 1/1993 | Corrigan et al. | 711/2 |
| 5,640,604 A | | 6/1997 | Hirano | |
| 5,704,055 A | * | 12/1997 | George et al. | 711/2 |
| 5,916,309 A | | 6/1999 | Brown et al. | |
| 5,951,658 A | | 9/1999 | Daray, Jr. et al. | |
| 6,016,522 A | | 1/2000 | Rossum | |
| 6,026,462 A | * | 2/2000 | George et al. | 711/2 |
| 6,046,817 A | * | 4/2000 | Brown et al. | 358/1.16 |
| 6,092,127 A | * | 7/2000 | Tausheck | 710/56 |
| 6,304,936 B1 | | 10/2001 | Sherlock | |
| 6,360,300 B1 | * | 3/2002 | Corcoran et al. | 711/139 |
| 6,370,619 B1 | * | 4/2002 | Ho et al. | 711/129 |
| 6,631,446 B1 | * | 10/2003 | Cherkauer et al. | 711/134 |
| 6,640,284 B1 | * | 10/2003 | Shaw et al. | 711/129 |
| 2003/0154333 A1 | * | 8/2003 | Gadre et al. | 710/56 |

FOREIGN PATENT DOCUMENTS

| | | | | |
|---|---|---|---|---|
| CA | 1489334 | * | 4/2004 | H04L/12/24 |
| EP | 000932098 | * | 7/1999 | G06F/13/12 |
| JP | 410049430 | * | 2/1998 | G06F/12/00 |

OTHER PUBLICATIONS

Schaffa et al. "A Demand Driven Access Protocol for High Speed Networks", Future Trends of Distributed Computing System '91 Workshop, pp. 158–164, 1992.*

* cited by examiner

*Primary Examiner*—Pierre-Michel Bataille

(57) ABSTRACT

A system supports allocating buffer storage for multiple buffers from a common storage area and dynamically reconfiguring the common storage area to shift buffer storage between buffers. A buffer mechanism controls access to buffer storage allocated within the common storage area. An allocation mechanism changes buffer storage allocation by moving one or more boundary pointers after verification that the reconfiguration is valid. The system provides more efficient use of memory and can allow a smaller memory requirement than conventional systems with fixed buffer storage sizes.

40 Claims, 9 Drawing Sheets

Figure 5
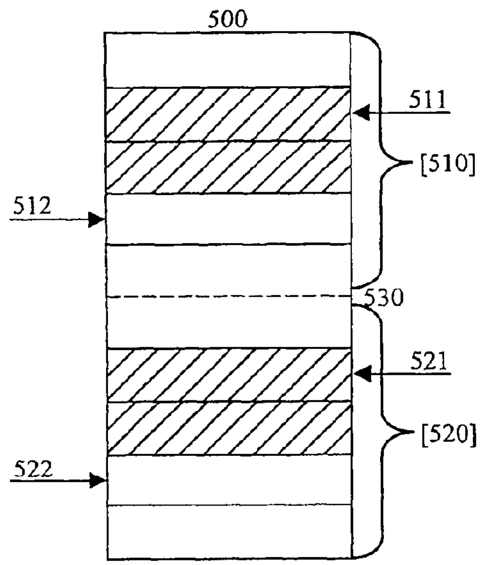
FIGURE 5A
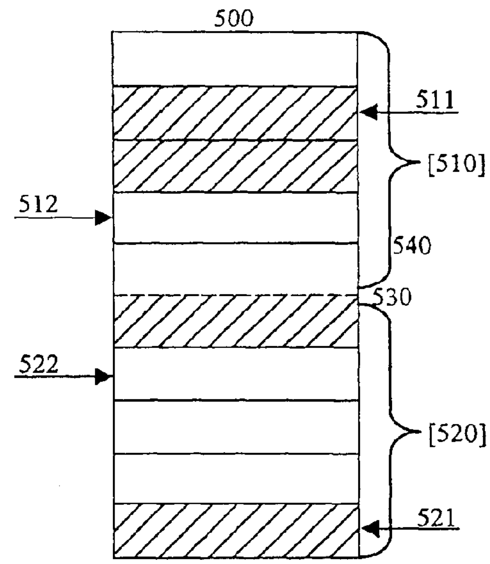
FIGURE 5B
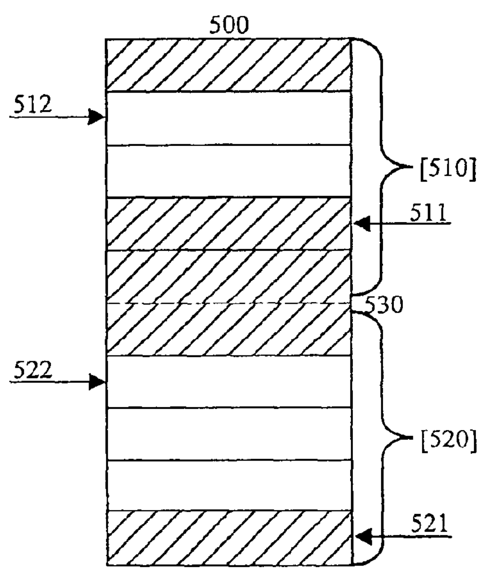
FIGURE 5C
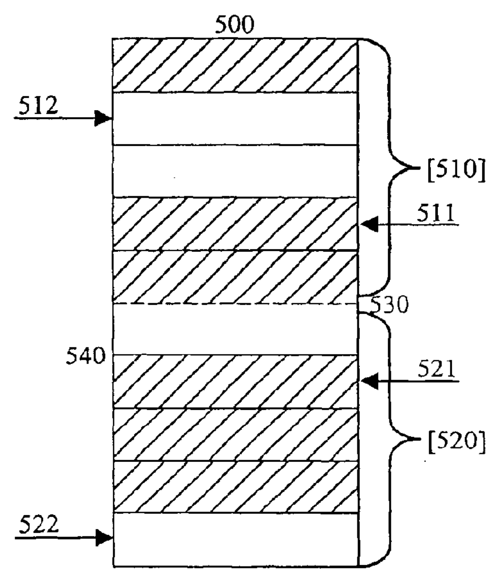
FIGURE 5D

DYNAMICALLY ADAPTIVE BUFFER MECHANISM

CROSS-REFERENCE TO RELATED APPLICATIONS

This application is a continuation of application Ser. No. 09/428,874 filed on Oct. 28, 1999, now U.S. Pat. No. 6,678,813.

BACKGROUND OF THE INVENTION

1. Field of the Invention

The present invention relates to a buffer architecture, and more specifically to a buffer architecture with multiple buffers allocated storage within a common storage area where the allocation is reconfigurable.

2. Description of the Related Art

Buffers are used within systems to provide temporary storage for data. Buffers are either FIFO (First-In-First-Out) or LIFO (Last-In-First-Out). In a FIFO buffer, data is written to the front end of the buffer and is read from the back end of the buffer. In a LIFO buffer, data is written and read from the front end of the buffer. Data in a FIFO buffer "Marches" through the buffer and is read in the strict ordering in which it was written. Data in a LIFO buffer is stacked on the buffer and the most recently written data is read before less recently written data.

FIFO buffers are generally implemented as a circular queue having a read pointer which points to the "next" location in the buffer storage to be read and a write pointer which points to the "next" location to be written. The write pointer is used by the control logic of the buffer to access a location where data is to be written in the buffer storage and the read pointer used by the control logic of the buffer to access a location whose data is to be read from buffer storage. A device which is connected to the buffer sends data to the buffer and the control logic writes the data to the buffer storage location corresponding to the write pointer. A device which reads from the buffer reads data presented to it by the control logic which reads the data from the buffer storage location corresponding to the read pointer.

LIFO buffers are generally implemented as a stack with a pointer to the bottom of the stack and a stack pointer to the location in buffer storage where data was last written. The stack pointer is usually both a read pointer and a write pointer. The stack pointer is used by the control logic of the buffer to point to the location in buffer storage where the most recently written data was stored. A device connected to the buffer reads from data presented to it by the control logic which reads the data from the buffer storage location corresponding to the stack pointer, then moves the stack pointer to the location in buffer storage previously written. A device writes data to the buffer and the control logic moves the stack pointer to the next free location in buffer storage and writes the data to the location in buffer storage corresponding to the pointer.

In a conventional buffer mechanism, the size of each buffer storage area is determined in advance and is fixed thereafter, especially in ASIC applications. This fixed allocation can be inefficient and has a larger memory requirement if multiple buffers are required by the system, not all of which will be simultaneously busy or active to the same degree. For example, in a system with two devices or applications needing buffer support, only one of which is active at any time, all of the buffers associated with the inactive device or application may be in an idle state, while the buffers for the active device or application may be of insufficient size for optimal performance.

SUMMARY OF THE INVENTION

Briefly, a system according to one embodiment of the present invention provides a buffer mechanism including at least two buffers, a common storage area coupled to the buffers, and an allocation mechanism coupled to the buffers. The common storage area provides buffer storage for the buffers. The allocation mechanism dynamically reconfigures the common storage area to shift buffer storage allocation between the buffers.

In one embodiment of the present invention, the allocation mechanism can include software routines, circuitry, or a combination of software and circuitry. The allocation mechanism receives an input signal requesting a desired reconfiguration of the common storage area. The allocation mechanism can selectively allocate portions (none, some, or all) of the common storage area to any of the buffers. One advantage of this embodiment of the invention is that it allows an inactive buffer's storage to be completely deallocated and an active buffer to receive the entire common storage area if needed.

Preferably, the allocation mechanism monitors certain parameters and allocates the common storage area responsive to those parameters. The parameters can comprise relative activity of the buffers, the "fullness" of the buffers (based on a comparison of the amount of data written to each buffer but not yet read with the size of the associated buffer storage area), throughput of a system providing the buffers, network traffic of the system, or mass storage activity of the system.

According to another embodiment of the invention, the allocation mechanism marks the boundaries of the regions of the common storage area allocated to each buffer with one or more boundary pointers. A portion of the common storage area allocated to a buffer can be dynamically reconfigured by changing the position of the associated boundary pointer.

To avoid disruption in buffer operation, the allocation mechanism preferably verifies that a requested reconfiguration of the common storage area is valid before performing the requested reconfiguration. The allocation mechanism can reject a requested reconfiguration of the common storage area that is invalid or delay a requested reconfiguration of the common storage area until the requested reconfiguration is valid. A requested reconfiguration of the common storage area can be considered valid if the region of the common storage area to be shifted to a first buffer does not contain data which has been written to a second buffer but not read and the region of the common storage area to be shifted to the first buffer is not adjacent to data which has been written to the first buffer but not read.

According to a further embodiment of the invention, the allocation mechanism produces an output signal. The output signal can indicate success or failure of the requested reconfiguration of the common storage area or that the requested reconfiguration will be delayed.

BRIEF DESCRIPTION OF THE DRAWINGS

A better understanding of the present invention can be obtained when the following detailed description of the preferred embodiment is considered in conjunction with the following drawings, in which:

FIGS. 5A, 5B, 5C, and 5D are block diagrams showing four possible configurations of a common storage area shared between two buffers each of which implements a circular queue;

DETAILED DESCRIPTION OF THE PREFERRED EMBODIMENT

Figure 1:
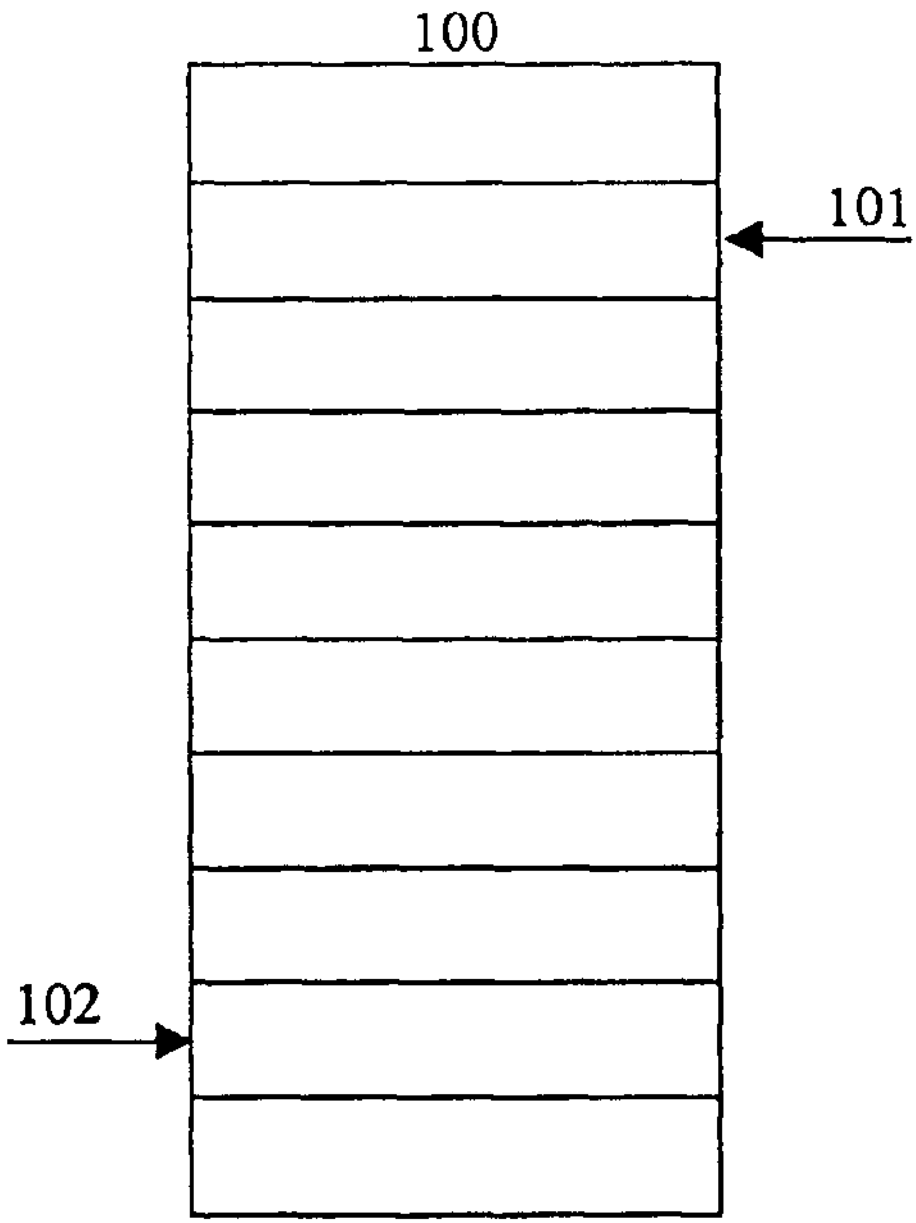
FIG. 1 is a block diagram of a typical circular queue.

Turning now to the drawings, FIG. 1 illustrates a typical FIFO buffer 100 implemented as a circular queue.[1] A read pointer 101 indicates the next location in buffer 100 to be read. Write pointer 102 indicates the next location in buffer 100 to be written. Although FIG. 1 shows read pointer 101 at a lower address than write pointer 102, they can exist at any location in buffer 100. If read pointer 101 is a lower address than write pointer 102, then the locations of the buffer starting with the locations pointed at by read buffer 101 through the location prior to write pointer 102 contain unread data. If read pointer 101 is at a higher address than write pointer 102, then the locations of the buffer starting with the locations pointed at by read buffer 101 through the end of the buffer and the locations of the buffer starting with the beginning of the buffer through the location prior to write pointer 102 contain unread data. In that situation, the circular queue is said to have wrapped in the buffer 100. If read pointer 101 and write pointer 102 are at the same address in buffer 100 is full if the buffer has wrapped, or empty if the buffer has not wrapped.

[1]In this and in all other figures, lower memory address are at the top of the figure and higher memory addresses are at the bottom. Each location or rank in a buffer is delineated with one or more lines separating that rank from adjacent ranks.

Figure 2:
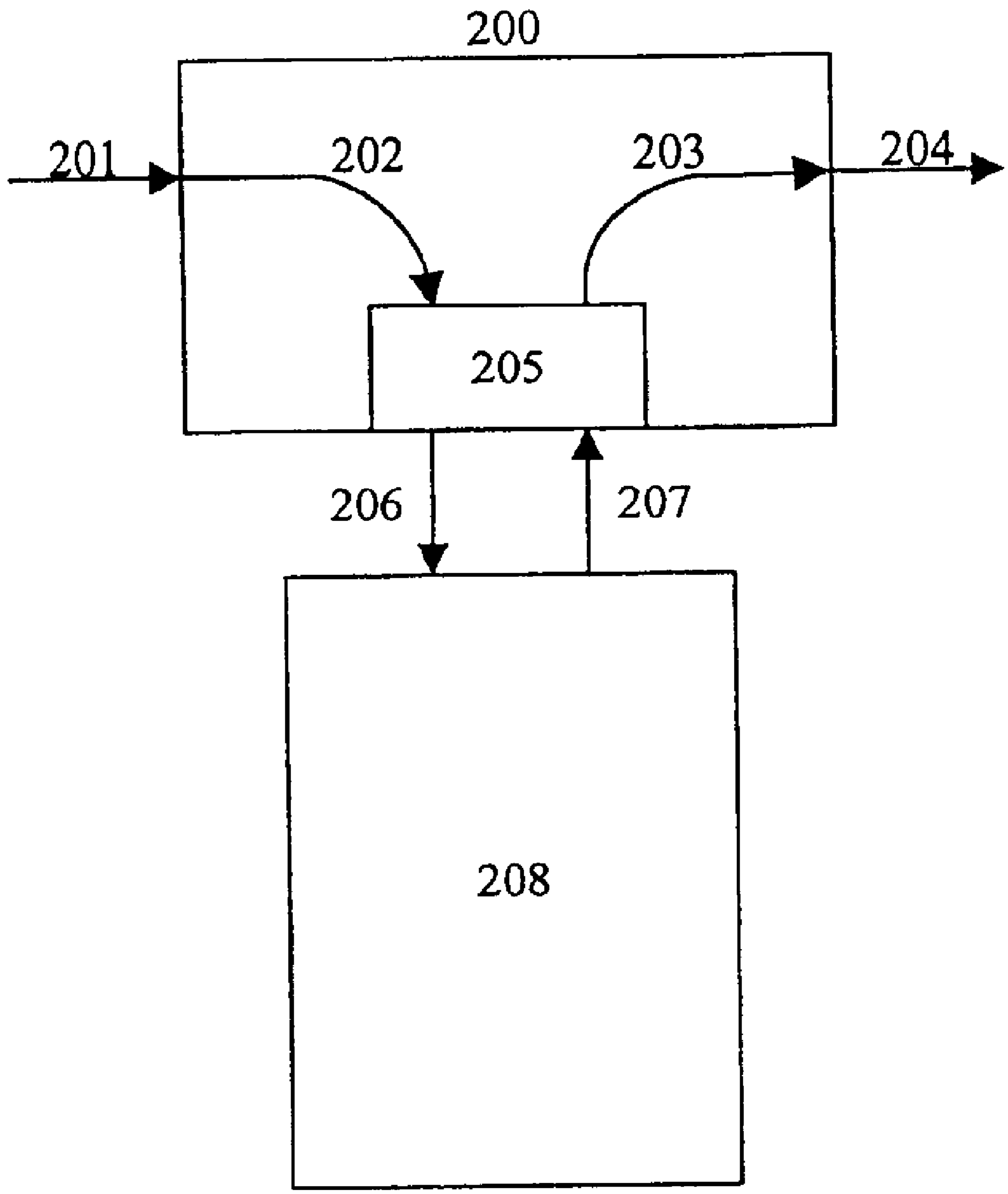
FIG. 2 is a block diagram illustrating a typical buffer implementation.

FIG. 2 illustrates a conventional buffer mechanism. This buffer could be either a FIFO or a LIFO buffer. Data is written to a buffer 200 via an input channel 201, which is connected to a control mechanism 205 by a coupling 202. Data is read from buffer 200 via output channel 204, which is coupled to control mechanism 205 by a coupling 203. Control mechanism 205 reads data from associated buffer storage 208 via input port 207, and writes data to associated buffer storage 208 via output port 206.

Figure 3:
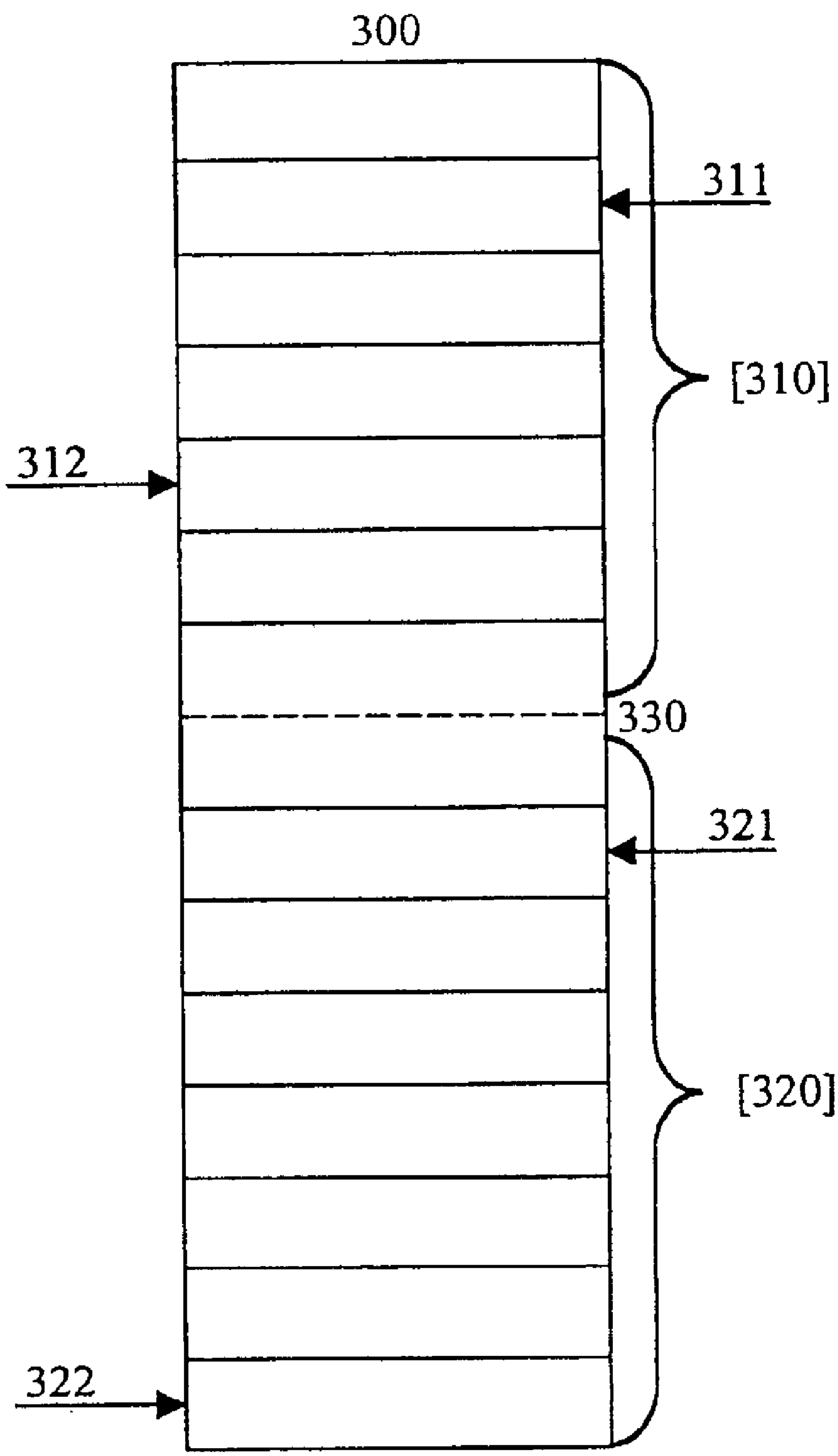
FIG. 3 is a block diagram showing two buffers sharing a common storage area.

FIG. 3 illustrates use of a common or shared storage area 300 for two buffers (301 and 302, not shown) according to one embodiment of the present invention with region 310 allocated to buffer 301 and region 320 allocated to buffer 302. A boundary or limit 330 separates regions 310 and 320. As explained in detail below, boundary 330 can be positioned above or below any rank of common storage area 300. In this example, region 310 is allocated to a FIFO buffer 301 having a read pointer 311 and a write pointer 312. Region 320 is allocated to a LIFO buffer 302 having a stack pointer 321 and a pointer 322 to the bottom of the stack. Although the common storage area 300 is fully allocated, note that the area between write pointer 312 and stack pointer 321 is unused by either buffer at this point in time, and can be reallocated in accordance with one embodiment of the present invention if desired.

Figure 4A:
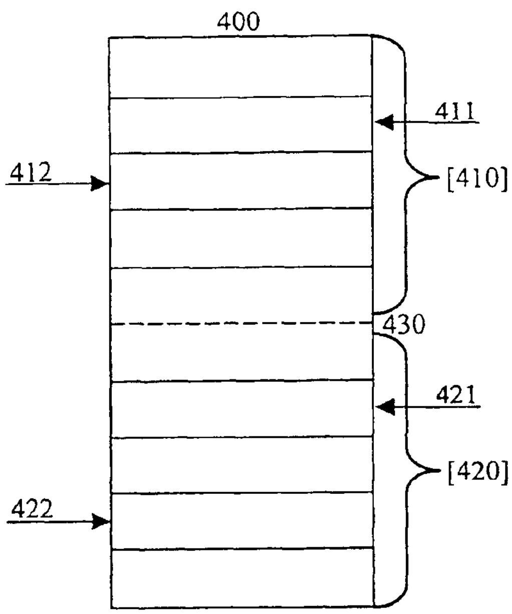
FIG. 4A is a block diagram showing the original configuration of the common storage area of FIG. 1.
Figure 4B:
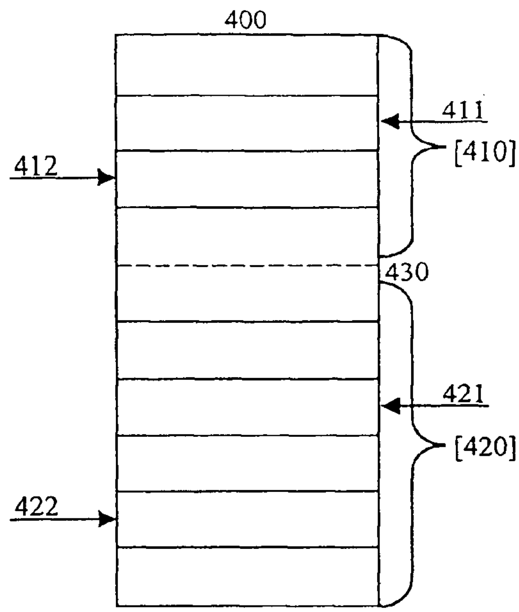
FIG. 4B is a block diagram showing a resulting reconfiguration of the common storage area of FIG. 1.

FIGS. 4A and 4B illustrates shifting the allocation of a common storage area 400 between two FIFO buffers implemented as circular queues as in one embodiment of the present invention. Although only two buffer regions and a single boundary are shown in this example, common storage area 400 can be allocated to any number of regions separated by any number of boundaries. Buffer 401 is associated with buffer storage area 410 and buffer 402 is associated with buffer storage area 420. Note that only the associated buffer storage areas 410 and 420 allocated from common storage area 400 are shown and not a complete buffer mechanism as described below in connection with FIG. 6. FIG. 4A shows common storage area 400 prior to the reallocation while FIG. 4B shows common storage area 400 after the reallocation. Neither of the read pointers 411 and 421 nor the write pointers 412 and 422 are moved, only the boundary 430 between the regions is repositioned. As shown in FIG. 4A, the initial allocation of common storage area 400 allocated five ranks to region 410 and five ranks to region 420. In FIG. 4B, the reallocation of common storage area 400 allocated four ranks to region 410 and six ranks to region 420, shrinking region 410 and enlarging region 420. Note that control of the boundary 430 is explained in detail below.

FIGS. 4A and 4B illustrate one advantage of an embodiment of the present invention. If buffer 401 is less active than buffer 402, the illustrated reallocation provides more space for buffer 402, making use of common storage area 400 more efficient.

Figure 4C:
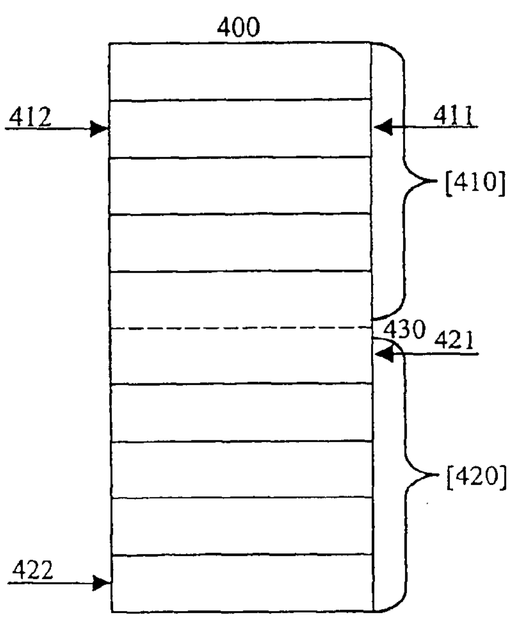
FIG. 4C is a block diagram showing another original configuration of the common storage area of FIG. 1.
Figure 4D:
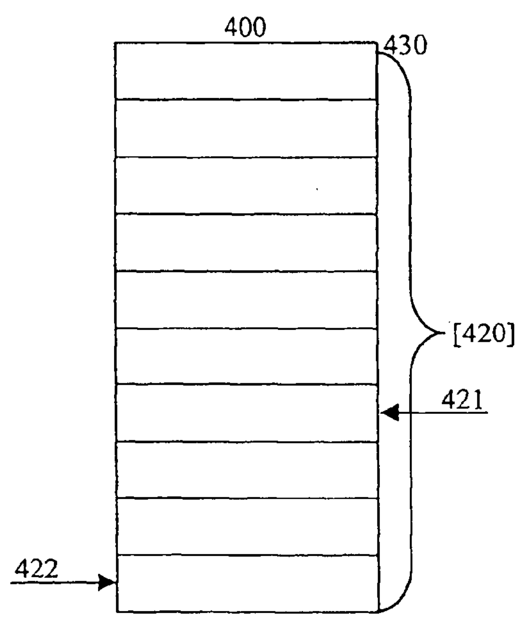
FIG. 4D is a block diagram showing another resulting reconfiguration of the common storage area of FIG. 1 which has completely deallocated one of the two buffers.

FIGS. 4C and 4D illustrate a reconfiguration of common storage area 400 that allocates none of the common storage area to region 410 and all of the common storage area 400 to region 420. In FIG. 4C, read pointer 411 and write pointer 412 point to the same rank of region 410, which indicates that the FIFO buffer 401 associated with region 410 has no data in it, while region 420 shows read pointer 421 at the first rank of region 420 and write pointer 422 at the last rank of region 420, indicating that the FIFO buffer 402 associated with region 420 is nearly full. In FIG. 4D, storage space has been completely deallocated from buffer storage region 410, shifting the entire common storage area 400 to region 420, providing more storage space to write data to the buffer 402.

FIGS. 4A, 4B, 4C, and 4D illustrate one advantage of an embodiment of the present invention. If buffer 401 need less buffer storage than its current allocation and buffer 402 needs more buffer storage space, an embodiment of the present invention allows reallocation of the common storage area 400, resulting in more efficient use of buffer storage than if each buffer were allocated a fixed buffer storage area as in a conventional buffer mechanism. For example, an application in accordance with one embodiment of the invention having two channels, each associated with a buffer, could be more efficient than one implemented with a conventional buffer mechanism. When one channel of the application is inactive, a buffer mechanism in accordance with one embodiment of the present invention could allocate more buffer space to the buffer associated with the active channel, reallocating buffer space from the inactive buffer to the active buffer.

FIGS. 5A, 5B, 5C, and 5D show four possible situations that can exist when buffer storage areas for two FIFO buffers 501 and 502 (not shown) implemented as circular queues are adjacent. In FIGS. 5A, 5B, 5C, and 5D, buffer storage areas 510 and 520 are separated by boundary 530. Read pointer 511 points to the location in buffer storage area 510 to be read next. Read pointer 512 points to the location in buffer storage area 520 to be read next. Write pointer 512 points to the location in buffer storage area 510 to be written next. Write pointer 522 points to the location in buffer storage area 520 to be written next. Shaded ranks contain data that has been written but not read. Unshaded ranks are empty of data. In FIG. 5A, boundary 530 can be shifted without disruption to buffers 501 and 502, because neither buffer storage area 510 or buffer storage area 520 has unread data adjacent to boundary 530. In FIGS. 5B, 5C, and 5D, however, boundary 530 cannot be moved without disruption to the buffers 501 and 502.

Note that any shifting or repositioning of boundary 530 where unread data is adjacent to boundary 530 will disrupt buffer operation, whether the unread data is above or below the boundary. Either unread data will be stolen from a buffer or ranks with no data belonging to a buffer will be added in a way that falsely indicates those ranks contain unread data.

As shown in FIGS. 5A, 5B, 5C, and 5D, these conditions can be expressed mathematically, where rp521 is read pointer 521, wp522 is write pointer 522, rp511 is read pointer 511, wp512 is write pointer 512, and b530 is boundary 530.

FIG. 5A illustrates the following conditions:

$b530 < rp521 \leqq wp522$ $b530 > wp512 \geqq rp511$

FIG. 5B illustrates the following conditions:

$b530 < wp522 < rp521$ $b530 > wp512 \geqq rp511$

FIG. 5C illustrates the following conditions:

$b530 < wp522 \leqq rp521$ $b530 > rp511 > wp512$

FIG. 5D illustrates the following conditions:

$b530 < rp521 \leqq wp522$ $b530 > rp511 > wp512$

In FIG. 5B, buffer storage area 520 has unread data adjacent to boundary 530. Shifting or repositioning boundary 530 to increase the size of buffer storage area 520 would falsely indicate the ranks between the old boundary 530 and new boundary 540 contain unread data.

In FIG. 5C, both buffer storage areas 510 and 520 have unread data adjacent to boundary 530. Shifting boundary 530 would steal unread data from whichever buffer storage area 510 or 520 was decreased in size.

In FIG. 5D, buffer storage area 510 has unread data adjacent to boundary 530. Shifting boundary 530 to increase the size of buffer storage area 510 would falsely indicate the ranks between the old boundary 530 and the new boundary 540 contain unread data.

Figure 6:
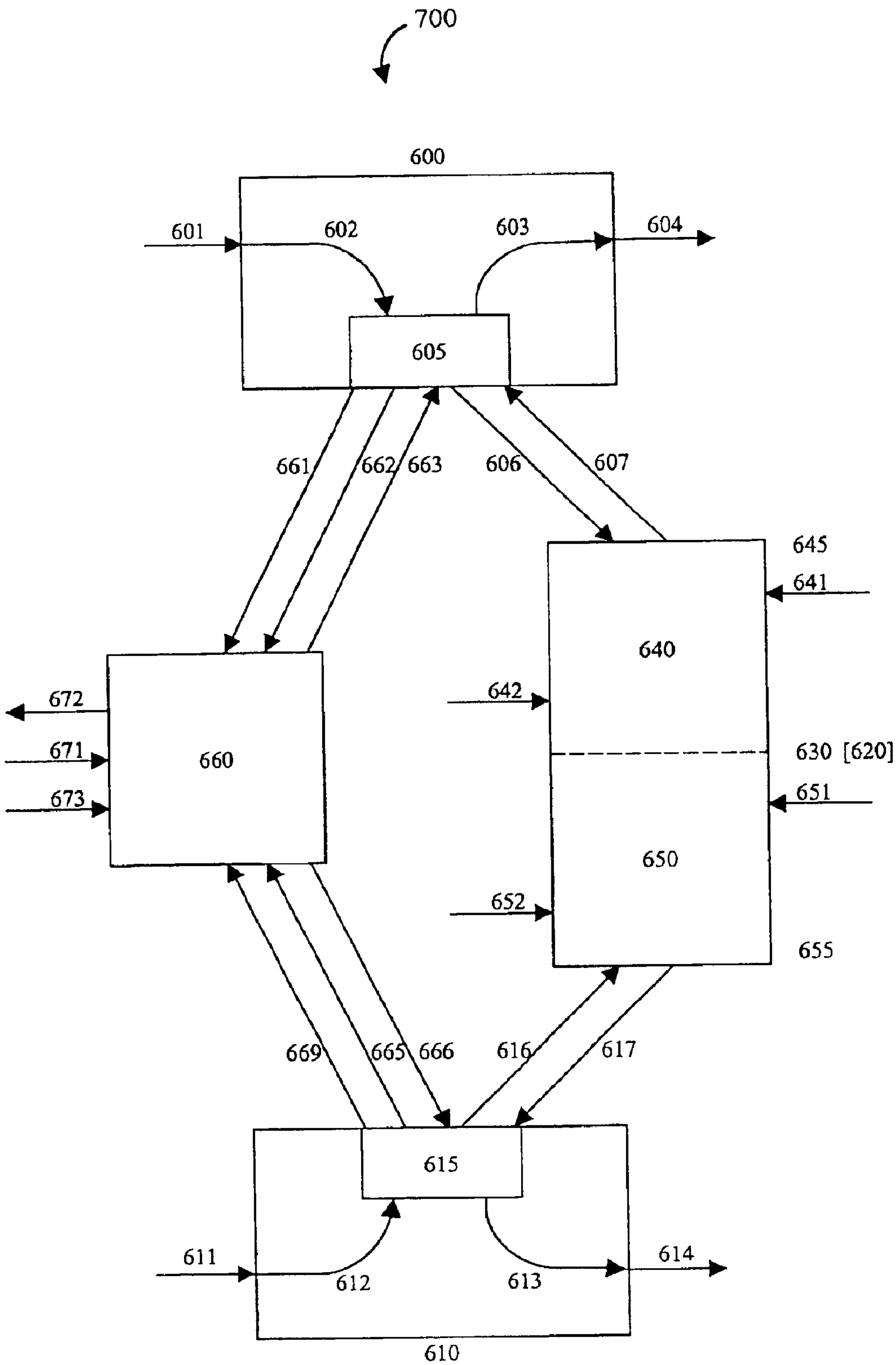
FIG. 6 is a block diagram showing two buffers, a common storage area and an allocation mechanism in accordance with one embodiment of the present invention.

FIG. 6 is a block diagram of a disclosed buffer mechanism 700 in accordance with one embodiment of the present invention. Buffers 600 and 610 share a common storage area 620 and are coupled to allocation mechanism 660. Input channels 601 and 611 write data to buffers 600 and 610 respectively. Output channels 604 and 614 read data from buffers 600 and 610 respectively. Coupling 602 connects input channel 601 to the control mechanism or controller 605 for buffer 600. Coupling 612 connects input channel 611 to control mechanism or controller 615 for buffer 610. Coupling 603 connects output channel 604 to control mechanism 605 for buffer 600. Coupling 613 connects output channel 614 to control mechanism 615 for buffer 610. Common storage area 620 is allocated into regions 640 and 650, separated by boundary 630. Region 640 is the associated buffer storage area for buffer 600. Region 650 is the associated buffer storage area for buffer 610. Control mechanism 605 writes data to its associated buffer storage area 640 via write port 606 and reads data from buffer storage area 640 via read port 607. Control mechanism 605 controls access to buffer storage area 640 using read pointer 641 and write pointer 642. Although FIG. 6 shows the common storage area 620 distinct from buffers 600 and 610, it should be understood that the common storage area 620 is part of or integrated with both buffer 600 and buffer 610.

Control mechanism 615 writes data to its associated buffer storage area 650 via write port 616 and reads data from buffer storage area 615 via read port 617. Control mechanism 615 controls access to buffer storage area 650 using read pointer 651 and write pointer 652. In one embodiment of the present invention, control mechanisms 605 and 615 can implement circular queues.

Control mechanism 605 knows the address of the beginning or top (645) and end or bottom (630) of the associated buffer storage area 640. Control mechanism 615 knows the address of the beginning (630) and end (655) of associated buffer storage area 650. Control mechanism 605 controls the range of the associated read pointer 641 and write pointer 642. Control mechanism 615 controls the range of the associated read pointer 651 and write pointer 652.

Allocation mechanism 660 is also coupled to control mechanism 605 by three data flows. Control mechanism 605 sends a copy of read pointer 641 and write pointer 642 to allocation mechanism 660 as pointer 661 and 662, respectively. Allocation mechanism 660 writes a changed location of boundary 630 to control mechanism 605 as pointer 663.

Allocation mechanism 660 is coupled to control mechanism 615 by three data flows. Control mechanism 615 sends a copy of read pointer 651 and write pointer 652 to allocation mechanism 660 as pointers 664 and 665, respectively. Allocation mechanism 660 writes a changed location of boundary 630 to control mechanism 615 as pointer 666.

Allocation mechanism 660 receives an input signal 671 requesting a reconfiguration of common storage area 620, and sends an output signal 672 indicating success, failure, or delay of the requested reconfiguration. External parameters 673 are read by allocation mechanism 660. In various embodiments of the invention, external parameters 673 for example, may correspond to throughput of the system providing the buffers, network traffic of the system, or mass storage activity of the system, for example. It should be understood that the parameters 673 may vary over time and that the above examples are not exhaustive. Those skilled in the art will appreciate that the allocation mechanism 660 and control mechanisms 605 and 615 may be implemented in a variety of ways.

In one embodiment of the invention, input signal 671 requests a desired reconfiguration of common storage area 620. In another embodiment of the invention, input signal 671 requests a reconfiguration of common storage area 620, and allocation mechanism 660 uses monitored external parameters 673, read pointers 661 and 664, write pointers 665 and 666, and the location of boundary 630 to determine a reconfiguration of common storage area 620. If the requested reconfiguration if valid, then allocation mechanism 660 writes the new boundary location to pointers 663 and 666, signaling control mechanisms 605 and 615 respectively that the size of their respective associated buffer storage areas 640 and 650 have changed. A reconfiguration can be considered valid if the region of the common storage area 620 to be shifted from buffer storage area 640 to buffer storage area 650 does not contain data which has been written to buffer 600 but not read and the region of the common storage area 620 to be shifted from buffer storage area 640 to buffer storage area 650 is not adjacent to data which has been written to buffer 610 but not read. Likewise, a reconfiguration can be considered valid if the region of the common storage area 620 to be shifted from buffer storage area 650 to buffer storage area 640 does not contain data which has been written to buffer 610 but not read and the region of the common storage area 620 to be shifted from buffer storage area 650 to buffer storage area 640 is not adjacent to data which has been written to buffer 600 but not read. Control mechanism 605 updates its known location of the end of the its associated upper storage area 640. Control mechanism 615 updates its known location of the start of its associated buffer storage area 650. Subsequent attempts to read from or write to buffers 600 and 610 are controlled by control mechanism 605 and 615 using the new allocation of common storage area 620. If the reconfiguration of common storage area 620 is successful, then allocation mechanism 660 signals success with output signal 672. If the reconfiguration was invalid, then allocation mechanism 660 signals failure with output signal 672. In one embodiment of the invention, allocation mechanism 660 can delay a requested reconfiguration that is temporarily invalid. In that situation, allocation mechanism 660 signals delay on output signals 672 and monitors pointers 661, 662, 664, 665 and 630, performs the reconfiguration when it becomes valid, and then signals success on output signal 672. It will be appreciated by those skilled in the art that other implementations of the buffer mechanism 700 which accomplish a like result are possible.

Figure 7:
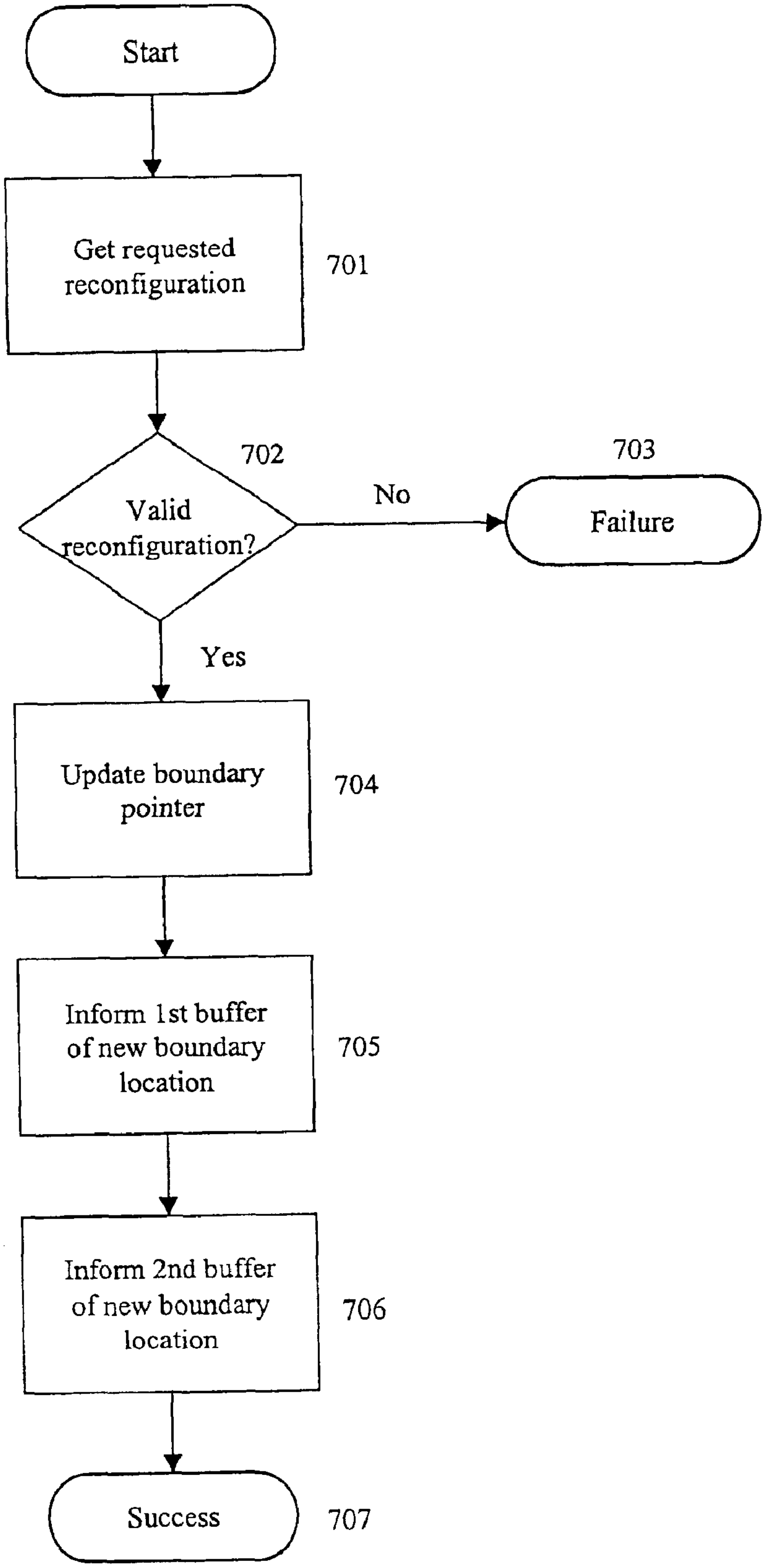
FIG. 7 is a flow chart describing exemplary steps the allocation mechanism can use to reallocate the common storage area in accordance with one embodiment of the present invention.

FIG. 7 is a flow chart of the steps involved in reallocation of storage from one buffer storage region to another. In step 701, allocation mechanism 660 receives the requested reconfiguration of common storage area 620. In step 702, allocation mechanism 660 determines whether or not the requested reconfiguration is valid. If the requested reconfiguration is not valid, allocation mechanism 660 signals failure in step 703 with output signal 672. If the requested reconfiguration is valid, allocation mechanism 660 updates boundary pointer 630 in step 704. In step 705, allocation mechanism 660 signals control mechanism 605 that the size of its associated buffer storage area has changed via pointer 663 which will contain the updated value of boundary 630. In step 706, allocation mechanism 660 informs control mechanism 615 that the size of its associated buffer storage area has changed via pointer 666 which contains the value of updated boundary pointer 630. In step 707, allocation mechanism 660 signals success with output signal 672. Those skilled in the art can implement these steps through hardware or software.

Figure 8:
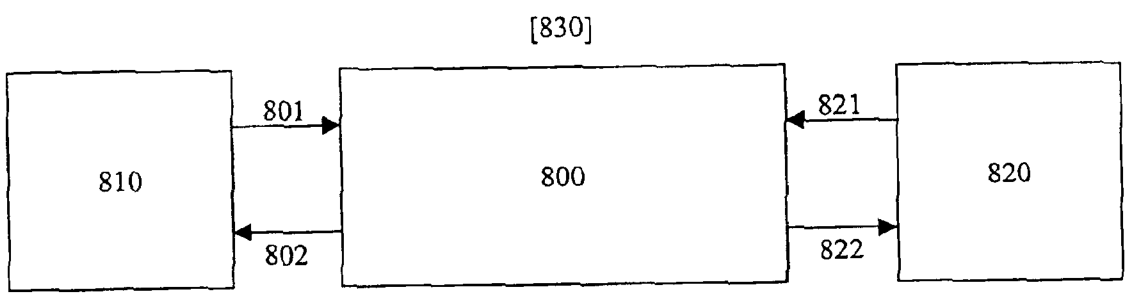
FIG. 8 is a block diagram of a system with two devices coupled to a buffer mechanism in accordance with one embodiment of the present invention.

FIG. 8 shows a system 830 with two devices coupled to a buffer mechanism according to one embodiment of the present invention. Device 810 writes data to buffer mechanism 800 via output port 801 and reads data from buffer mechanism 800 via input port 802. Device 820 writes data to buffer mechanism 800 via output port 821 and reads data from buffer mechanism 800 via input port 822. In accordance with one embodiment of the invention, the device 810 can be a processor and the device 820 can be a mass storage device. The device 810 can also be a mass storage device and the device 820 can be a network interface. It will be understood by one skilled in the art that the above examples are not exhaustive. Note that a buffer mechanism in accordance with one embodiment of the invention is applicable to buffers for storing data, address information, or both data and address information.

Figure 9:
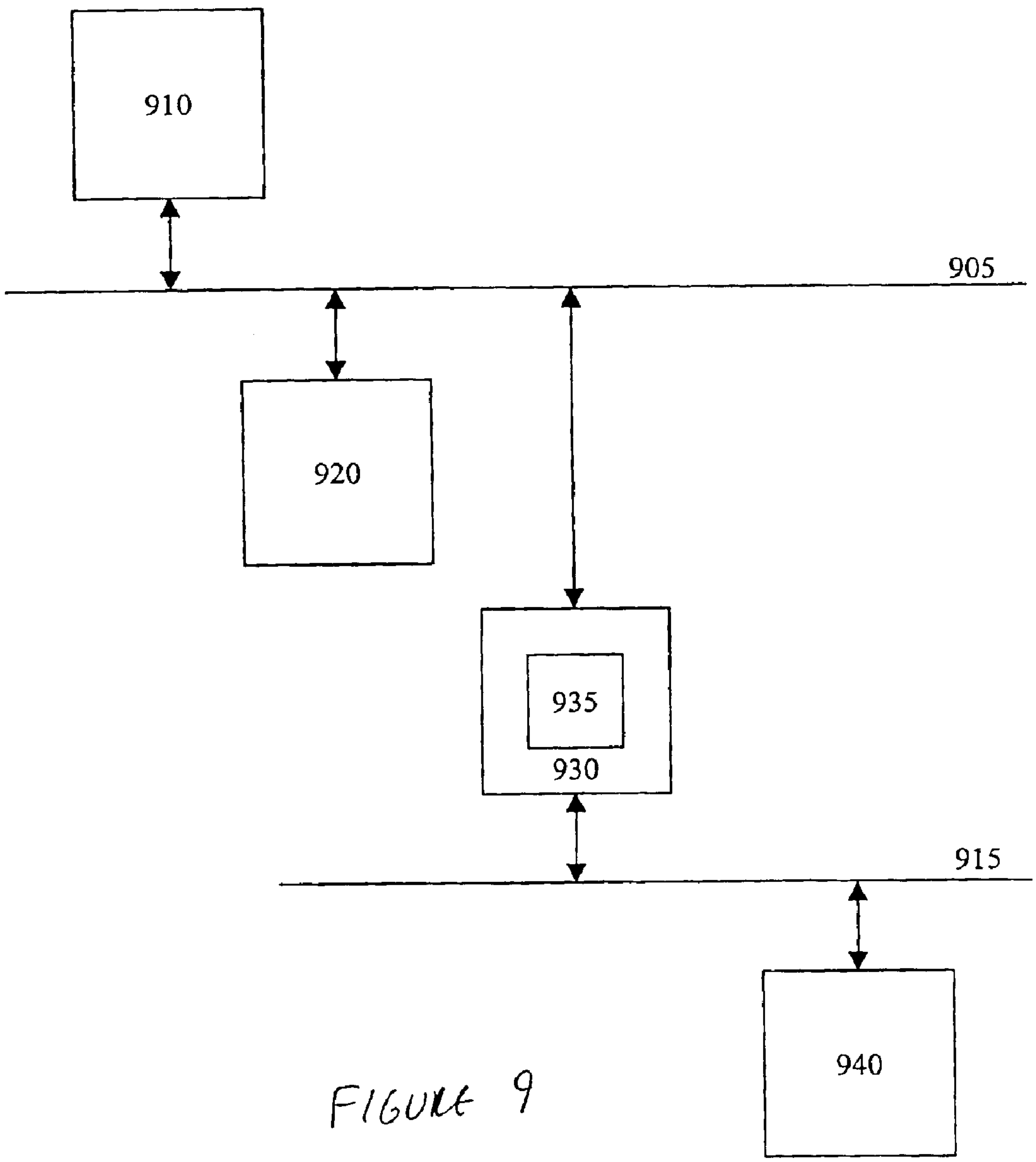
FIG. 9 is a block diagram of a system with two busses connected via a bridge which provides a buffer mechanism in accordance with one embodiment of the present invention.

FIG. 9 shows a system with two busses 905 and 915 connected via a bridge 930. Bus 905 has a processor 910 and another device 920 connected to it. It is understood that multiple devices and/or processors could be connected to bus 905. As shown, bus 915 has a device 940 attached to it. Bridge 930 provides a buffer mechanism 935 according to one embodiment of the present invention, buffering data and/or address information transferred between bus 905 and bus 915.

The foregoing disclosure and description of the preferred embodiment are illustrative and explanatory thereof, and various changes in the steps, circuit elements, and wiring connections, as well as in the details of the illustrated circuitry and construction and method of operation may be made without departing from the spirit of the invention.

We claim:

1. A buffer mechanism comprising:

a first buffer and a second buffer;

a common storage area coupled to the buffers and separate from the buffers, the common storage area providing additional buffer storage for the first buffer and the second buffer; and an allocation mechanism coupled to the buffers and the common storage area, the allocation mechanism being adapted to dynamically reconfigure the common storage area to change allocation of the additional buffer storage between the first buffer and the second buffer.

2. A buffer mechanism as in claim 1, where each buffer comprises:

an input channel;

an output channel; and a control mechanism coupled to the input channel, the output channel, and the allocation mechanism, the control mechanism configured to access the additional buffer storage of the common storage area.

3. A buffer mechanism as in claim 2, wherein the control mechanism comprises a read pointer to a next location in the common storage area to be read.

4. A buffer mechanism as in claim 2, wherein the control mechanism comprises a write pointer to a next location in the common storage area to be written.

5. A buffer mechanism as in claim 2, wherein the control mechanism implements a circular queue.

6. A buffer mechanism as in claim 1, wherein the first and second buffers each comprise respective FIFO buffers.

7. A buffer mechanism as in claim 1, wherein one of the first and second buffers comprises a FIFO buffer and the other of the first and second buffers comprises a LIFO buffer.

8. A buffer mechanism as in claim 1, where the buffers are implemented in software.

9. A buffer mechanism as in claim 1, where the buffers are implemented in circuitry.

10. A buffer mechanism as in claim 1, where the allocation mechanism comprises software routines.

11. A buffer mechanism as in claim 1, where the allocation mechanism comprises circuitry.

12. A buffer mechanism as in claim 1, where the allocation mechanism is configured to receive an input signal requesting a desired reconfiguration of the common storage area.

13. A buffer mechanism as in claim 1, where the allocation mechanism is configured to allocate portions of the common storage area to either the first buffer or the second buffer.

14. A buffer mechanism as in claim 1, where the allocation mechanism is configured to monitor external parameters and allocates storage to the first buffer and the second buffer within the common storage area responsive to said parameters.

15. A buffer mechanism as in claim 1, where the allocation mechanism marks a boundary between a portion of the common storage area associated with the first buffer and a portion of the common storage area associated with the second buffer with one or more boundary pointers.

16. A buffer mechanism as in claim 1, where the allocation mechanism is configured to verify a requested reconfiguration of the common storage area is valid before performing the requested reconfiguration.

17. A buffer mechanism as in claim 16, wherein the allocation mechanism is configured to produce an output signal indicating success or failure to the requested reconfiguration of the common storage area.

18. A buffer mechanism as in claim 16, where the allocation mechanism is configured to produce an output signal indicating the requested reconfiguration of the common storage area will be delayed.

19. A system comprising:

a processor; and a buffer mechanism coupled to the processor, the buffer mechanism comprising:

a first buffer and a second buffer;

a common storage area coupled to the buffers and separate from the buffers, the common storage area providing additional buffer storage for the first buffer and the second buffer; and an allocation mechanism coupled to the buffers and the common storage area, the allocation mechanism being adapted to dynamically reconfigure the common storage area to change allocation of the additional buffer storage between the first buffer and the second buffer.

20. A system as in claim 19, each buffer of the buffer mechanism comprising:

an input channel;

an output channel; and a control mechanism coupled to the at least one input channel, the output channel, and the allocation mechanism to access the additional buffer storage of the common storage area.

21. A system as in claim 20, where the control mechanism of each buffer of the buffer mechanism comprises a read pointer to a next location in the buffer storage area to be read.

22. A system as in claim 20, where the control mechanism of each buffer of the buffer mechanism comprises a write pointer to a next location in buffer storage area to be written.

23. A system as in claim 20, where the control mechanism of each buffer of the buffer mechanism implements a circular queue.

24. A system as in claim 19, where the allocation mechanism is configured to monitor external parameters and to allocate storage to the first buffer and the second buffer within the common storage area responsive to those parameters.

25. A system as in claim 19, where the allocation mechanism of the buffer mechanism is configured to mark a boundary between a first buffer storage area associated with the first buffer and a second buffer storage area associated with the second buffer with one or more boundary pointers.

26. A system as in claim 19, wherein the allocation mechanism of the buffer mechanism is configured to verify a requested reconfiguration of the common storage area is valid before performing the requested reconfiguration.

27. A system as in claim 26, wherein the allocation mechanism is configured to produce an output signal indicating success or failure of the requested reconfiguration.

28. A system as in the claim 26, wherein the allocation mechanism is configured to produce an output signal indicating the requested reconfiguration will be delayed.

29. A system as in claim 19, wherein the first buffer is associated with a first device and the second buffer is associated with a second device.

30. A system as in claim 29, wherein the first device comprises a mass storage device.

31. A system as in claim 29, wherein the second device comprises a network interface.

32. A buffer mechanism comprising:

a first buffer and a second buffer;

a common storage area coupled to the buffers and separate from the buffers, the common storage area providing additional buffer storage for the first buffer and the second buffer;

a first allocation means for allocating a first storage region of the common storage area to the first buffer;

a second allocation means for allocating a second storage region of the common storage area to the second buffer; and a reconfiguring means for dynamically reconfiguring the common storage area to change the allocation between the first storage region and the second storage region.

33. A buffer mechanism as in claim 32, wherein the reconfiguration means comprises:

means for verifying that a reconfiguration decision is valid before reconfiguring the common storage area.

34. A buffer mechanism as in claim 32, wherein the reconfiguration means comprises:

means for verifying that a reconfiguration decision is valid before reconfiguring the common storage area.

35. A method of allocating a common storage area among a plurality of buffers, the plurality of buffers including a first buffer and a second buffer, the method comprising:

allocating a first storage region of the common storage area to the first buffer, wherein the first buffer is coupled to the common storage and separate from the common storage area;

allocating a second storage region of the common storage area to the second buffer, wherein the second buffer is coupled to the common storage area and separate from the common storage area; and dynamically reconfiguring the common storage area to change buffer storage allocation between the first buffer and the second buffer.

36. A common storage area allocation method as in claim 35, wherein dynamically reconfiguring comprises:

moving a boundary between the first storage region and the second storage region.

37. A common storage area allocation method as in claim 36, comprising:

monitoring parameters and performing the reconfiguration step responsive to the parameters.

38. A method for manufacturing a buffer mechanism comprising:

providing a first buffer and a second buffer;

providing a common storage area coupled to the buffers and separate from the buffers, the common storage area supplying additional buffer storage for the first buffer and the second buffer; and providing an allocation mechanism coupled to the buffers and the common storage area, the allocation mechanism being adapted to dynamically reconfigure the common storage area to change allocation of the additional buffer storage between the first buffer and the second buffer.

39. A method for manufacturing as in claim 38, wherein providing an allocation mechanism comprises providing an allocation mechanism that marks a boundary between a portion of the common storage area associated with the first buffer and a portion of the common storage area associated with the second buffer with one or more boundary pointers.

40. A method for manufacturing as in claim 38, wherein providing an allocation mechanism comprises providing an allocation mechanism configured to move a boundary between a first storage region of the common storage area and a second storage region of the common storage area.

* * * * *